(12) United States Patent
Shimura et al.

(10) Patent No.: US 9,604,133 B2
(45) Date of Patent: Mar. 28, 2017

(54) TOUCH-CONTROLLED GAME CHARACTER MOTION PROVIDING DYNAMICALLY-POSITIONED VIRTUAL CONTROL PAD

(71) Applicant: Nintendo Co., Ltd., Kyoto (JP)

(72) Inventors: Yukimi Shimura, Redmond, WA (US); Stephen Lee, Redmond, WA (US); Yoonjoon Lee, Redmond, WA (US); Steven Petofalvi, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/225,005

(22) Filed: Aug. 1, 2016

(65) Prior Publication Data
US 2017/0014711 A1    Jan. 19, 2017

Related U.S. Application Data

(63) Continuation of application No. 14/878,304, filed on Oct. 8, 2015, now Pat. No. 9,427,663, which is a continuation of application No. 14/510,348, filed on Oct. 9, 2014, now Pat. No. 9,174,133, which is a continuation of application No. 11/464,221, filed on Aug. 14, 2006, now Pat. No. 8,882,590.

(60) Provisional application No. 60/745,892, filed on Apr. 28, 2006.

(51) Int. Cl.
| | |
|---|---|
| A63F 13/214 | (2014.01) |
| A63F 13/2145 | (2014.01) |
| A63F 13/426 | (2014.01) |
| A63F 13/55 | (2014.01) |
| A63F 13/95 | (2014.01) |
| A63F 13/49 | (2014.01) |

(52) U.S. Cl.
CPC ........ *A63F 13/2145* (2014.09); *A63F 13/426* (2014.09); *A63F 13/49* (2014.09); *A63F 13/55* (2014.09); *A63F 13/95* (2014.09); *A63F 2300/1075* (2013.01); *A63F 2300/204* (2013.01); *A63F 2300/301* (2013.01)

(58) Field of Classification Search
CPC .... A63F 13/214; A63F 13/2145; A63F 13/42; A63F 2300/1068; A63F 2300/1075
USPC ......................................................... 463/31
See application file for complete search history.

(56) References Cited

U.S. PATENT DOCUMENTS

| | | |
|---|---|---|
| 4,355,805 A | 10/1982 | Baer et al. |
| 6,080,061 A | 6/2000 | Watanabe et al. |
| 6,462,840 B1 | 10/2002 | Kravtsov |
| 6,597,345 B2 | 7/2003 | Hirshberg |
| 6,921,336 B1 | 7/2005 | Best |

(Continued)

*Primary Examiner* — Allen Chan
(74) *Attorney, Agent, or Firm* — Nixon & Vanderhye P.C.

(57) ABSTRACT

Methods and apparatus for controlling movement of a digital object displayed on a screen provide a virtual dynamic direction control pad based on zone detection and touch stroke direction to control customized animated character motion. A player wishing to move the digital object can use a stylus or other touch to indicate a first point on the screen. When the player first touches the stylus to the screen, the system analyzes the touch and divides the screen into multiple zones around the first point indicated by the player. To move the object, the player moves the stylus to a second point on the screen. Movement of the stylus to a second point within one of these zones causes the digital object to perform a predetermined action. Each zone has a predetermined associated action. Direct control of character motion by the game player is enhanced.

20 Claims, 9 Drawing Sheets

Exemplary Illustrative
Game Character Movement Zones

(56) References Cited

U.S. PATENT DOCUMENTS

| | | |
|---|---|---|
| 7,093,202 B2 | 8/2006 | Saund et al. |
| 8,146,018 B2 | 3/2012 | Shimura et al. |
| 2005/0159223 A1 | 7/2005 | Tahara et al. |
| 2005/0176502 A1 | 8/2005 | Nishimura et al. |
| 2005/0202869 A1 | 9/2005 | Miyamoto et al. |
| 2005/0215323 A1 | 9/2005 | Miyamoto et al. |
| 2006/0019752 A1 | 1/2006 | Ohta |
| 2006/0258455 A1 | 11/2006 | Kando |
| 2007/0265081 A1 | 11/2007 | Shimura et al. |
| 2015/0024845 A1 | 1/2015 | Shimura et al. |
| 2016/0023103 A1 | 1/2016 | Shimura et al. |

Exemplary Illustrative
Game Play Platform

Exemplary Illustrative Game Play Platform Block Diagram

Exemplary Illustrative
Game Character Definition

Exemplary Illustrative
Game Character Movement Zones

TOUCH-CONTROLLED GAME CHARACTER MOTION PROVIDING DYNAMICALLY-POSITIONED VIRTUAL CONTROL PAD

CROSS-REFERENCES TO RELATED APPLICATIONS

This application is a continuation of application Ser. No. 14/878,304, filed Oct. 8, 2015, which is a continuation of application Ser. No. 14/510,348, filed Oct. 9, 2014 (which is now U.S. Pat. No. 9,174,133), which is a continuation of application Ser. No. 11/464,221 filed Aug. 14, 2006 (which is now U.S. Pat. No. 8,882,590), which is a nonprovisional application claiming the benefit of priority from application No. 60/745,892, filed on Apr. 28, 2006, each of these applications is incorporated herein by reference in their entirety. This application also incorporates the entirety of U.S. application Ser. No. 11/464,227 (which is now U.S. Pat. No. 8,146,018).

STATEMENT REGARDING FEDERALLY SPONSORED RESEARCH OR DEVELOPMENT

None.

FIELD

The technology herein relates to control of a digital object in a virtual gamespace. More specifically, the technology herein relates to video game user interfaces using touch screens, and to control of digital objects such as animated characters in a virtual gamespace using touch.

BACKGROUND AND SUMMARY

Portable, handheld video game systems are popular among people of all ages. Some examples of these systems include Nintendo GameBoy® and Nintendo GameBoy Advance®. With the advent of touch screens, the player can now interact with the game screen using a stylus.

Handheld portable computing systems which use a touch screen and stylus have existed in the past, but these systems have generally been directed at data storage and organization. While basic games have been developed for such systems, games nearing the magnitude and scope of typical portable handheld gaming have generally not been available in the past. People using these stylus controlled systems have generally used them for business and time management, not as video game systems.

Even though stylus based portable devices exist, additional improvements allowing the player to experience the benefits a stylus could provide in a video game system would be beneficial. Needs exist for stylus based control that are as easy to use as joystick control of a digital object in a virtual gamespace.

The exemplary illustrative non-limiting implementations herein provide methods and apparatus for controlling movement of a digital object displayed on a screen. The digital object may be any digital object such as for example a game character. A player wishing to move the digital object can use a stylus or other touch to indicate a first point on the screen. For the object to be selected, the point indicated by the player may be within a selection area specified for selecting the digital object for movement. To move the object, the player moves the touch to a second point on the screen, thereby providing a stroke. The digital object then moves based on the direction of the stroke.

When the player first touches the stylus to the screen, the system analyzes the touch and divides the screen into multiple zones around the first point indicated by the player. Movement of the stylus to a second point within one of these zones causes the digital object to perform a predetermined action. Each zone has a predetermined action associated with it. For example, a rightmost zone may have a rightwards movement associated with it, a leftmost zone may have a leftwards movement associated with it, and the like.

Exemplary illustrative non-limiting implementations allow a player to manipulate a game object in a flexible fashion. The player feels as if he is directly manipulating the game object and so has a close connection to the game experience.

BRIEF DESCRIPTION OF THE DRAWINGS

These and other features and advantages will be better and more completely understood by referring to the following detailed description of exemplary non-limiting illustrative embodiments in conjunction with the drawings, of which.

DETAILED DESCRIPTION

Exemplary Illustrative Touch Screen Based Game Play Platform

Figure 1A:
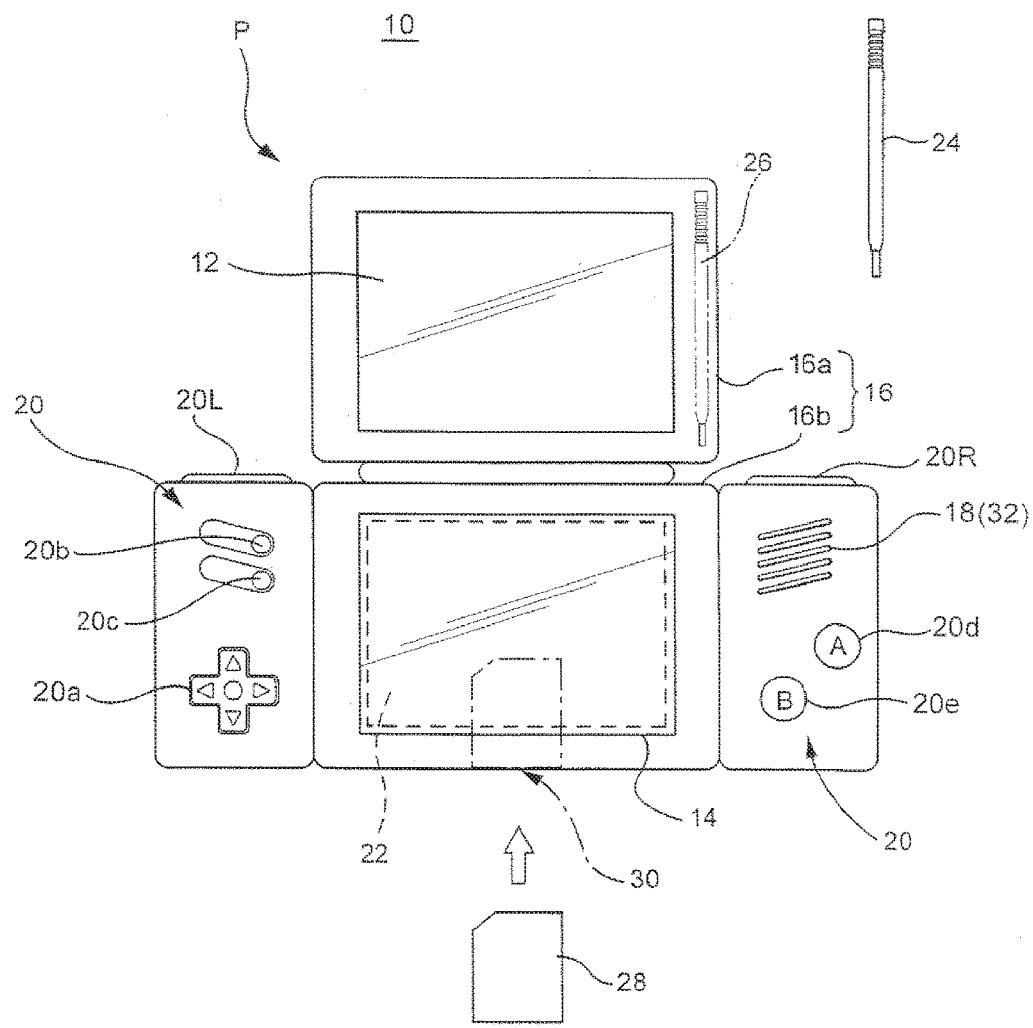
FIG. 1A is an external view of an exemplary illustrative non-limiting implementation of a game apparatus 1 for executing a game program providing stylus-based object control.
Figure 1B:
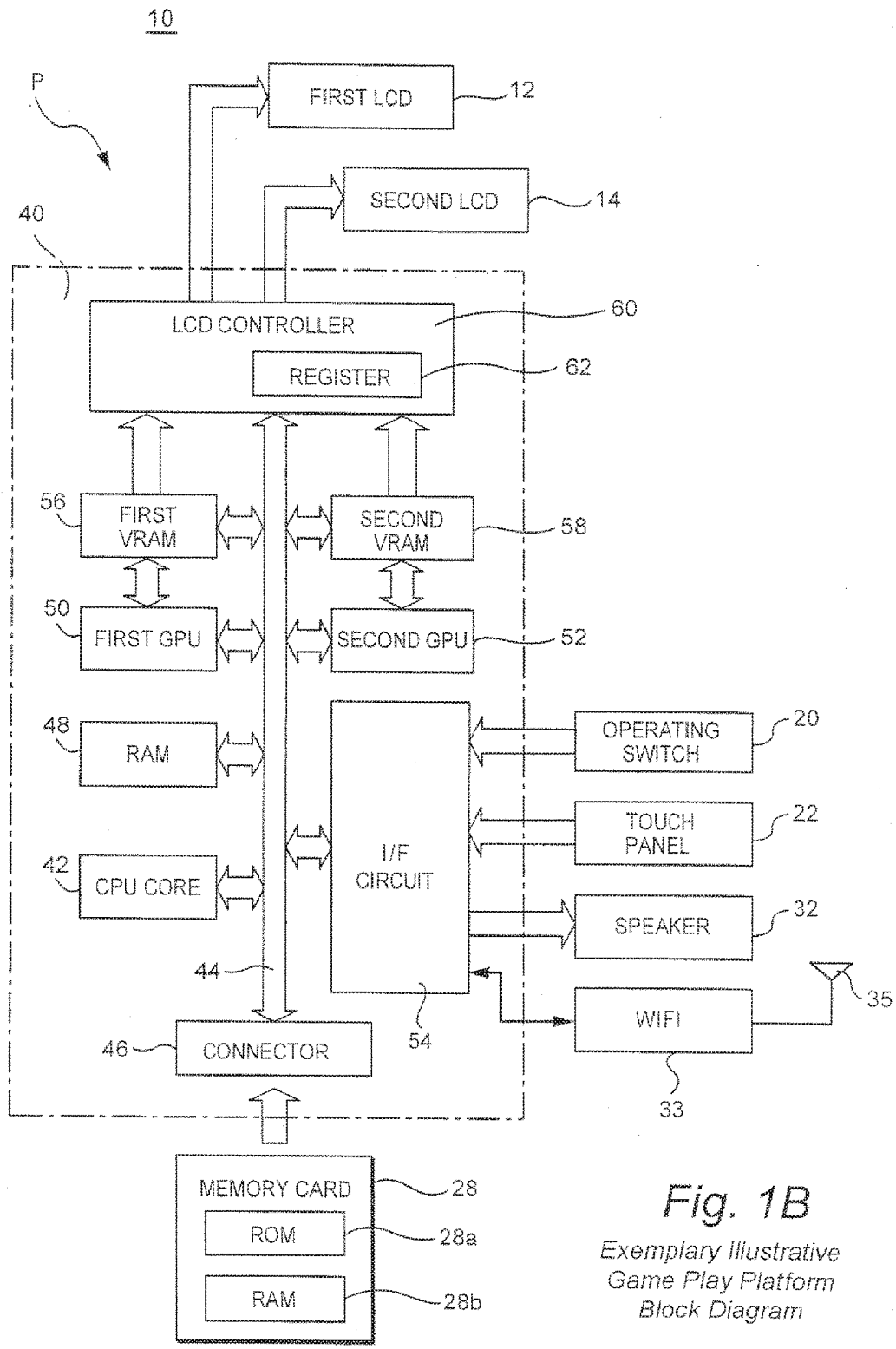
FIG. 1B is a block diagram showing an exemplary illustrative internal structure of the game apparatus 1.

FIGS. 1A and 1B show an exemplary illustrative non-limiting game device P. Referring to FIG. 1A, a game device P of one exemplary illustrative non-limiting implementation includes a first liquid crystal display (LCD) 12 and a second LCD 14. The LCD 12 and the LCD 14 are provided on a housing 16 so as to be arranged in a predetermined position. In this implementation, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is used as a display in this implementation, an EL (Electro-Luminescence) display or a plasma display may be used in place of the LCD. Alternatively, a CRT display may be used for game consoles, arcade video game machines, etc.

As can be understood from FIG. 1A, the upper housing 16a has a planar shape a little larger than a planar shape of the LCD 12, and has an opening formed so as to expose a display surface of the LCD 12 from one main surface thereof. The lower housing 16b has a planar shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

The upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged. The upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. The switches 20d and 20e are placed at the right of the LCD 14 on the one main surface of the lower housing 16b. Switches 20L and 20R are placed in a part of an upper edge (top surface) of the lower housing 16b and lie on each side of the connected portion with the upper housing 16a.

The direction instructing switch 20a functions as a digital joystick, and is used for instructing a moving direction of a player character (or player object) to be operated by a player, instructing a moving direction of a cursor, and so forth by operating any one of four depression portions. The start switch 20b is formed by a push button, and is used for starting (restarting) a game, temporarily stopping (pausing) a game, and so forth. The select switch 20c is formed by the push button, and used for a game mode selection, etc.

The action switch 20d (that is, the A button) is formed by the push button, and allows the player character to perform an action that is game specific. For example, it may be used for instructing character movement direction, such as hitting (punching), throwing, holding (obtaining), riding, jumping, etc. For example, in an action game, it is possible to apply an instruction of jumping, punching, moving arms, etc. In a role-playing game (RPG) or a simulation RPG, it is possible to apply an instruction of obtaining an item, selecting and determining acts or commands, etc. The action switch 20e (that is, the B button) is provided by a push button, and is used for changing a game mode selected by the select switch 20c, canceling an action determined by the A button 20d, and so forth.

The action switch (left depression button) 20L and the action switch (right depression button) 20R are formed by a push button. The left depression button (L button) 20L and the right depression button (R button) 20R can perform the same operation as the A button 20d and the B button 20e, and also function as a subsidiary of the A button 20d and the B button 20e.

A touch panel 22 is provided on a top surface of the LCD 14. As the touch panel 22, any type of a resistance film system, an optical system (infrared rays system) or an electrostatic capacitive coupling system, for example, can be used. In response to an operation of depressing, stroking or touching with a stick 24, a pen (stylus pen), or a finger (hereinafter, referred to as "stick 24, etc.") on a top surface (detection surface) of the touch panel 22, the touch panel 22 detects coordinates of operating position of the stick 24, etc. and outputs coordinate data corresponding to the detected coordinates.

According to this implementation, the exemplary non-limiting resolution of the display surface of the LCD 14 is 256 dots×192 dots, and a detection accuracy of a detection surface of the touch panel 22 is also rendered 256 dots×192 dots in correspondence to the resolution of the display surface (this is the same or approximately the same as for the LCD 12). Detection accuracy of the detection surface of the touch panel 22, however, may be lower than the resolution of the display surface of the LCD 14, or higher than it. In the detected coordinates of the touch panel 22, a point of origin (0, 0) is on an upper left corner, a right horizontal direction is an X-axis normal direction and a downward vertical direction is a Y-axis normal direction (the same applies to the coordinate system of the LCD 14 (12)). A three-dimensional game space often has X and Y coordinates on the horizontal plane and a Z axis in a vertical direction.

It is possible to display different game images (game screens) on the LCD 12 and the LCD 14. This allows the player to point at (specify) or make active (move) character images displayed on the screen of the LCD 14, such as player characters, enemy characters, item characters, text information and icons, or select a command, by operating the touch panel 22 with the stick 24, etc. This also makes it possible to change an orientation of a virtual camera (viewpoint) provided in the three-dimensional game space or scroll through a game screen (the screen is displayed in a state of being gradually moved).

As stated above, the game device 10 has the LCD 12 and the LCD 14 as a display portion of two screens, and by providing the touch panel 22 on an upper surface of any one of them (LCD 14 in the first embodiment), the game device 10 has the two screens (LCD 12, 14) and the two operating portions (20, 22).

Additionally, in this implementation, the stick 24 can be inserted into a housing portion (housing slot) 26 provided in proximity to a side surface (right side surface) of the upper housing 16a, for example, and taken out therefrom as necessary. In a case of providing no stick 24, it is not necessary to provide the housing portion 26.

The game device 10 further includes a memory card (or game cartridge) 28. The memory card 28 is detachable, and inserted into a loading slot 30 provided on a rear surface or a lower edge (bottom surface) of the lower housing 16b. Although omitted in FIG. 1A, a connector 46 (see FIG. 1B) is provided at a depth portion of the loading slot 30 for connecting a connector (not shown) provided at an end portion of the memory card 28 in the loading direction. When the memory card 28 is loaded into the loading slot 30, the connectors are connected with each other, and therefore, the memory card 28 is accessible by a CPU core 42 (see FIG. 1B) of the game device 10.

A speaker 32 (see FIG. 1B) is provided at a position corresponding to the sound hole 18 inside the lower housing 16b. A battery accommodating box is provided on a rear surface of the lower housing 16b, and a power switch, a volume switch, an external expansion connector, an earphone jack, etc. are provided on a bottom surface of the lower housing 16b.

FIG. 1B is a block diagram showing an exemplary illustrative non-limiting electric configuration of the game device 10. Referring to FIG. 1B, the game device 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b. The ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a virtual game to be executed by the game device 10. ROM 28a may also store image data (character image, background image, item image, icon (button) image, message image, etc.), data representing sounds or music used to accompany the game (sound data), etc. The RAM (backup RAM) 28b stores (saves) proceeding data and result data of the game.

The RAM 48 is used as a buffer memory or a working memory. The CPU core 42 loads the game program, the image data, the sound data, etc. stored in the ROM 28a of the memory card 28 into the RAM 48, and executes the loaded game program. The CPU core 42 executes a game process while storing in the RAM 48 data (game data and flag data) temporarily generated in correspondence with progress of the game.

The game program, the image data, the sound data, etc. are loaded from the ROM 28a entirely at a time, or partially and sequentially so as to be stored (loaded) into the RAM 48.

Each of the GPU 50 and the GPU 52 forms a part of a rendering means. They may be provided by, for example, a single chip ASIC. GPU 50, 52 receive graphics commands from the CPU core 42 to generate game image data according to the graphics command. The CPU core 42 provides each of the GPU 50 and the GPU 52 with an image generating program (included in the game program) used to generate the game image data in addition to the graphics command.

GPU 50 is connected with a first video RAM (hereinafter, referred to as "VRAM") 56. GPU 52 is connected with a second VRAM 58. The GPU 50 and the GPU 52 obtain data required for the GPU 50 and the GPU 52 to execute the graphics command (image data: character data, texture data, etc.) by access to a first VRAM 56 and a second VRAM 58, respectively. The CPU core 42 writes the image data required for graphics drawing into the first VRAM 56 and the second VRAM 58 via the GPU 50 and the GPU 52. The GPU 50 accesses the VRAM 56 to generate the game image data for graphics drawing. GPU 52 accesses the VRAM 58 to generate the game image data for graphics drawing.

The VRAM 56 and the VRAM 58 are connected to the LCD controller 60. The LCD controller 60 includes a register 62. Register 62 consists of, for example, one bit. Register 62 stores a value of "0" or "1" (data value) according to an instruction of the CPU core 42. When the data value of the register 62 is "0", the LCD controller 60 outputs the game image data generated by the GPU 50 to the LCD 12, and outputs the game image data generated by the GPU 52 to the LCD 14. When the data value of the register 62 is "1", the LCD controller 60 outputs the game image data generated by the GPU 50 to the LCD 14, and outputs the game image data generated by the GPU 52 to the LCD 12.

The LCD controller 60 reads out game image data directly from the VRAM 56 and the VRAM 58, and reads out game image data from the VRAM 56 and the VRAM 58 via the GPU 50 and the GPU 52.

The I/F circuit 54 is connected with the operating switch 20, the touch panel 22 and the speaker 32. Operating switch 20 is the above-described switches 20a, 20b, 20c, 20d, 20e, 20L and 20R. In response to an operation of the operating switch 20, a corresponding operation signal (operation data) is input to the CPU core 42 via the I/F circuit 54. The coordinates position data from the touch panel 22 is input to the CPU core 42 via the I/F circuit 54. The CPU core 42 reads-out the sound data necessary for the game such as a game music (BGM), a sound effect or voices of a game character (onomatopoeic sound), etc. from the RAM 48, and outputs it from the speaker 32 via the I/F circuit 54.

FIG. 1B further shows a "Wi-Fi" wireless adapter 33 and associated antenna 35. Wi-Fi wireless adapter 33 comprises a transceiver (transmitter and receiver) that allows gaming platform P to communicate wirelessly via network N. Wi-Fi wireless adapter 33 may comprise for example a baseband system, modulator and amplifiers compliant with the conventional 802.11 standard. Wi-Fi wireless adapter 33 wirelessly receives information transmitted over RF from other devices, and wirelessly sends information to other devices. Other wired or wireless technology (e.g., Ethernet, WAN, Bluetooth, etc.) could be substituted. Wireless adapter 33 allows gaming platform P to communicate with other gaming platforms or other devices in the same room or vicinity and/or with more remote devices. Network N could be a very localized network such as a 20-meter range WI-FI ad hoc connection, or it could be a worldwide network such as the Internet, or any other wired or wireless network you can think of.

Exemplary Illustrative Stroke-Controlled Game Character Motion

Figure 2:
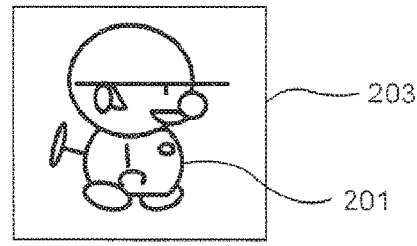
FIG. 2 shows an exemplary illustrative non-limiting movable game character.

In one exemplary illustrative non-limiting implementation shown in FIG. 2, a game character 201 is provided for display on one of displays 12, 14. A selection area or bounding box 203 ("stylus detector") is provided around the game character. The game character may be 2D or 3D and may be defined and rendered using any known graphics technique. The size of the selection area 203 can be any size, up to and including the size of the actual game screen or beyond, but in this exemplary illustrative non-limiting implementation the area 203 is a box or rectangle that is only slightly larger than the character 201.

In the exemplary illustrative implementation, the selection area 203 is used to detect whether a particular touch on touch screen 13 pertains to the game character 201. Touches by stylus 16 or otherwise within the selection area 203 area are interpreted to be relevant to the motion of game character 201, whereas touches outside of this bounding box are determined not to be relevant to the motion of game character 201. While a rectangle is shown as the shape of the area 203 in this exemplary illustrative non-limiting implementation, the selection area 203 may be of any suitable shape such as a polygon, a circle or any other shape. Exemplary size of the stylus detector box can be for example 32×28 pixels. The same or different (e.g., smaller) bounding box can be used for collision detection in generating animation effects.

Figure 3:
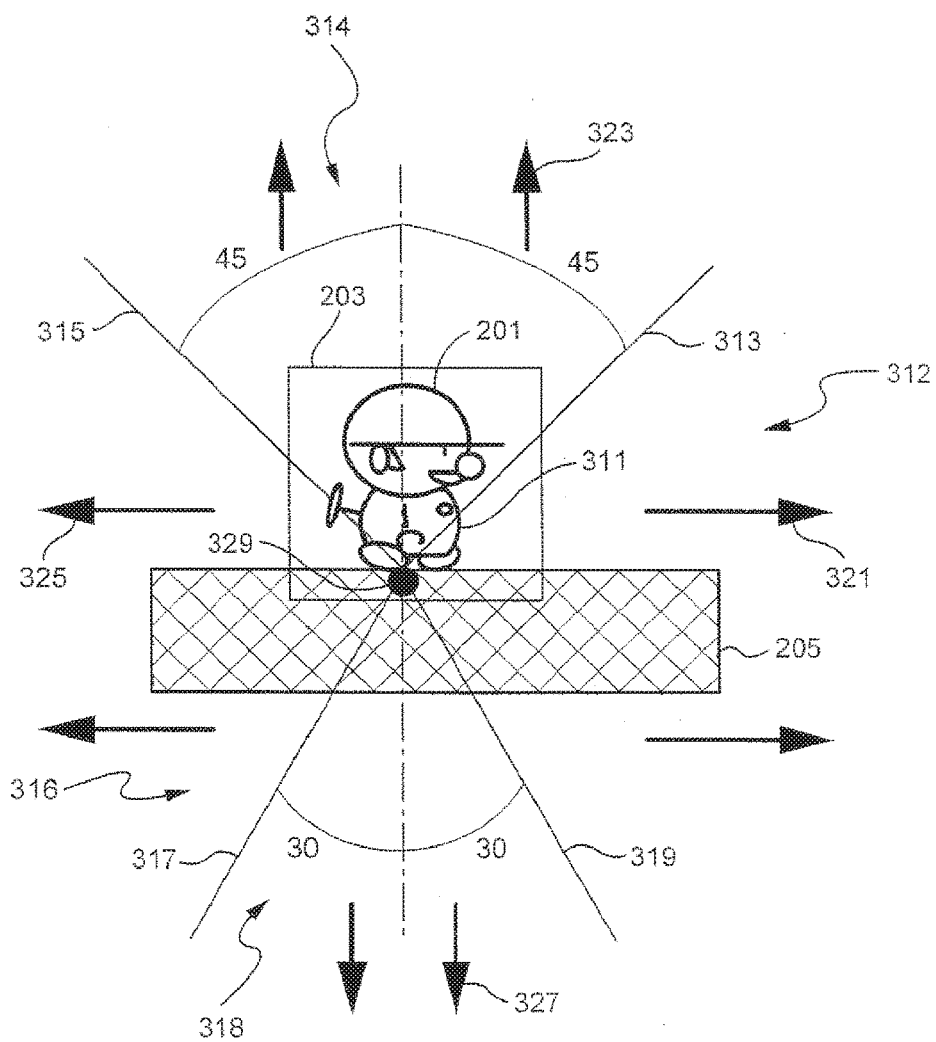
FIG. 3 shows another exemplary representation of a movable game character in a virtual gamespace.

In the exemplary illustrative non-limiting implementation shown in FIG. 3, a position 329 represents the point where the game screen was first touched by a stylus or other mechanism. Character 201 is shown standing on a virtual platform 205. Character 201 can move right or left in the direction of arrows 321, 325 respectively by walking, in an animated fashion, along the platform to the right or to the left. The character 201 is also able to jump or otherwise move upwardly in the direction of arrow 323 (e.g., to ascend to an upper level), or alternatively it is able to jump or otherwise move downwardly in the direction of arrow 327 (e.g., to descend to a lower level).

In the exemplary illustrative non-limiting implementation, the character 201 can not move in any arbitrary direction. Instead, just like a human or animal on a platform, the game character can move only right or left along the surface of the platform. He may also be able to move up or down (which may or may not model real world motion).

System P desirably translates touching contact (e.g., strokes from one point to another) with touch screen 13 to a command that controls the direction and/or other characteristics of the motion of character 201. Assuming that the touch is within the bounding box 203, once the position 329 has been set, system P divides the screen into a plurality of virtual zones, defined in this exemplary illustrative non-limiting implementation by four outwardly extending lines or vectors 313, 315, 317, 319 from the initial or resting touch of the stylus. In this exemplary illustrative non-limiting implementation, a right zone 312 defined by a vector 313 (in a "northeast" direction as compared to the face of a compass) and a vector 319 (in a "southeast" direction), has a rightward ("eastward") direction associated with it, as indicated by the right arrow 321. Similarly, a left zone 316, defined by the upper ("northwesterly" oriented) left line 315 and the lower ("southwesterly" oriented) left line 317, has the leftward direction associated with it as indicated by the left arrow 325. These vectors and associated zones can be computed dynamically by CPU 21 upon detection of a stylus touch, or they can be accessed from precomputed data stored in memory, or they can be characteristics of the touch screen itself.

In this exemplary illustrative non-limiting implementation, an upper zone 314 is defined by upper ("northeasterly") right line 313 and upper ("northwesterly") left line 315 and has an upward direction associated with it as indicated by the up arrow 323. A lower zone 318 is defined by the lower ("southwesterly") left line 317 and the lower right ("southeasterly") line 319 and has the downward direction associated with it as indicated by the down arrow 327. While this exemplary illustrative non-limiting implementation represents division into four zones, any number of zones may be provided as required by a particular game. These zones can be considered a virtual direction control pad on the surface of the screen display. Indicia of the zone delineations may or may not be displayed.

To move the character 311, the stylus is moved from its initial position 329 (this could be "stylus down" position or a position the stylus has inhabited for more than a predetermined time period) to any one of the four zones 312, 314, 316, 318 to provide a "stroke" or gesture. The path of the stroke itself may or may not be displayed. If the stylus moves into the right zone 312, the character 311 moves to the right (e.g., by walking along the platform 205) as indicated by the right arrow 321. If the stylus moves into any of the remaining zones 314, 316, 318, the character 311 is moved in the direction indicated by the corresponding arrow 323, 325, 327. In this exemplary illustrative non-limiting implementation, upward movement is characterized by a jump, the climbing of a ladder, or the upward entrance into a pipe. Downward movement can be characterized by ducking, descending a ladder, or traveling down into a pipe. If there is no pipe, then downward stylus motion can put the character into the "stop" or "rest" state. Any appropriate movement can correspond with any zone. In one exemplary illustrative non-limiting implementation, the character does not for example go into the "walk" state by touching alone, but rather needs the player to define a direction by inputting a stroke. This applies to walk and jump states from standing still, idling, and initial state. In the exemplary illustrative non-limiting implementation, speed of pen movement can be as slow as character 201's walking speed (e.g., ¾ pixel per frame) or any other value.

Figure 4:
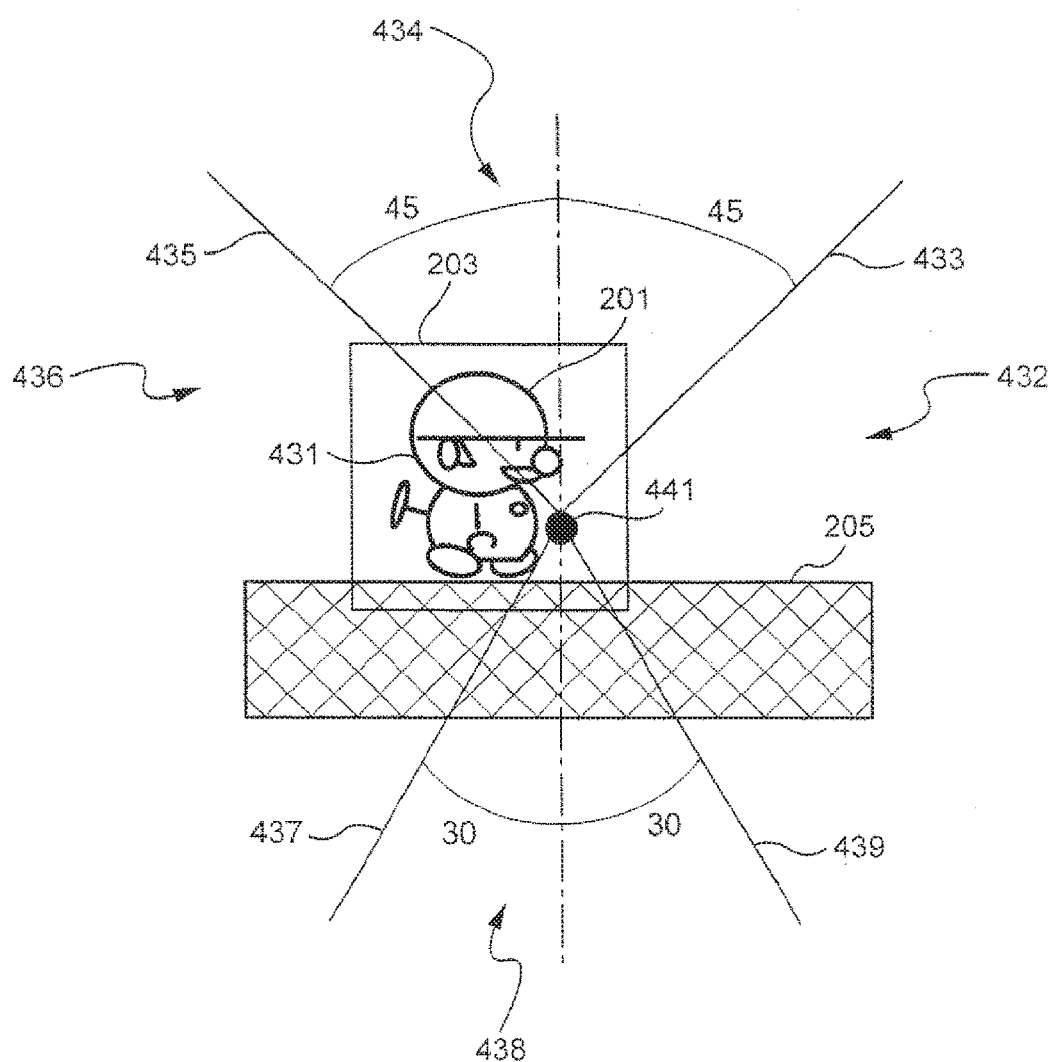
FIG. 4 shows an additional exemplary representation of a movable game character in a virtual gamespace.

In a further exemplary illustrative non-limiting implementation shown in FIG. 4, the initial position 441 is tested to be within the selection area 203 in order to have the character 431 move in a selected direction. This implementation is also divided into four zones 432, 434, 436, 438 delineated by four lines 433, 435, 437, 439 as in FIG. 3 but the new detection areas in FIG. 4 have been dynamically calculated based on current (different) pen position and so are in different positions relative to the FIG. 3 scenario. Such initial pen position can be anywhere in the pen detection area . . . not just at the center or centroid of the character or other predetermined location relative to the character's geometry. In this exemplary illustrative non-limiting implementation, as long as the stylus moves from an initial position 441 within the selection area 203, the character 431 will move in the appropriate direction corresponding to the selected zone. If the initial position 441 were outside the selection area 203, the character 431 would remain unaffected by stylus movement. The selection area 203 can range in size, and need not necessarily be fixed around the character.

Figure 5:
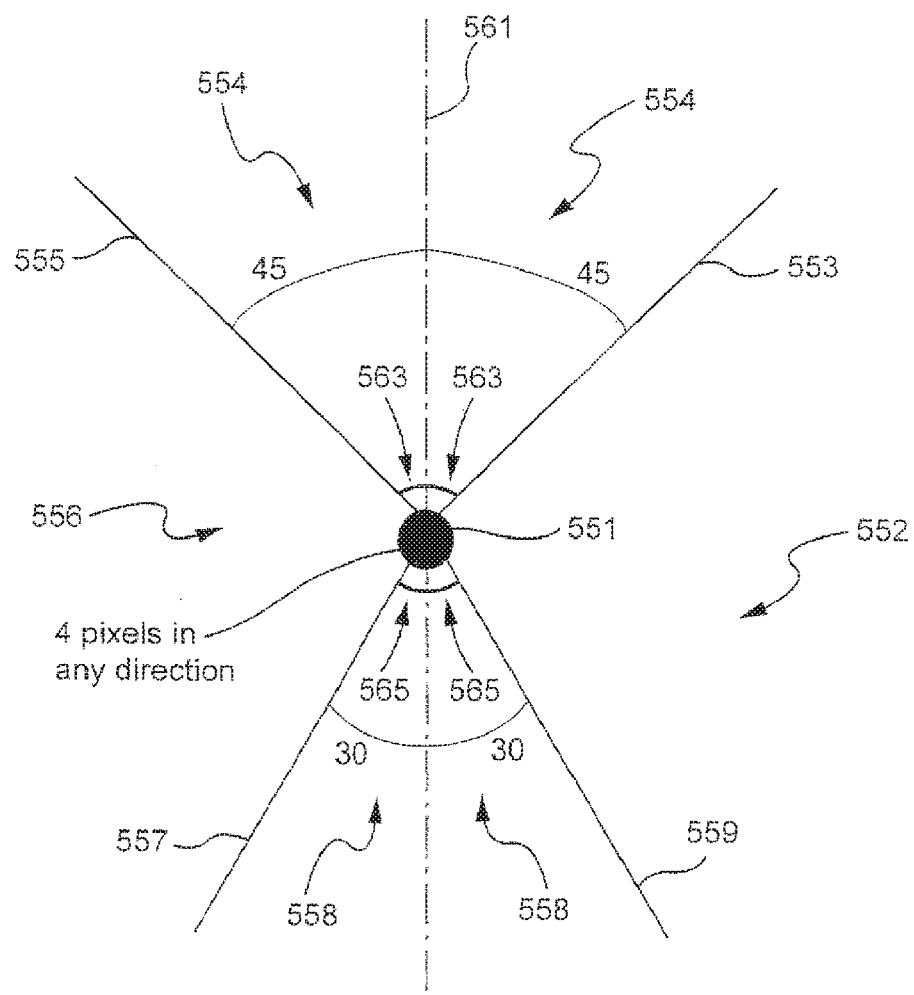
FIG. 5 shows an exemplary non-limiting implementation of stylus detection zones.

A potential zone configuration is shown in FIG. 5. In this exemplary illustrative non-limiting implementation, the zones 552, 554, 556, 558 all share a common corner with the initial selection point 551. When a stylus (not shown) is placed on a screen, the position of the initial selection point 551 is determined and the corresponding zones 552, 554, 556, 558 are also determined. Each zone has an action or a movement associated with it. For example, the rightmost zone 552 may have a rightwards movement associated with it, the lowermost zone(s) 558 may have downward movement associated with them, and the like.

The zones are defined by the lines 553, 555, 557, 559 bracketing the zones, with, for example, the rightmost zone 552 defined by the upper right line 553 and the lower right line 559. Movement of the stylus from the initial selection point 551 into the rightmost zone 552 causes a game object (not shown) to take the action or make the movement associated with the rightmost zone 552.

The area of the initial selection point may be defined as larger than a single pixel, so that slight stylus movements do not direct game object movement. In this exemplary illustrative non-limiting implementation, the exemplary size of the initial selection point 551 is a four pixel radius. This means that any stylus movement over a range of less than four pixels from the spot where the stylus initially touched (and/or rested for a while on) the screen will result in no change in the game object. The size of this point can vary in accordance with a desire to make movement decisions more precise (smaller size) to making movement decisions requiring a more definitive, longer stylus stroke (larger size).

In this exemplary illustrative non-limiting implementation, the upper right and upper left lines 553, 555 are provided at angles to the vertical 561. The lower right and lower left lines 557, 559 are also provided at angles to the vertical 561. In this exemplary illustrative non-limiting implementation, the upper zone 554 is larger than the lower zone 558. This is achieved by creating a greater angle between the upper lines 553, 555 and the vertical 561. One reason why a developer may want to provide a larger upper zone is that the human hand tends to vary more horizontally during upward strokes than during downward ones, so the region determining upward movement can be made larger. In this exemplary illustrative non-limiting implementation, the preferred upper angles 563 are forty-five degrees (45°) from the vertical 561 to the upper right and left lines 553, 555 and the preferred lower angles 565 are thirty degrees (30°) from the vertical 561 to the lower left and right lines 557, 559. Any suitable or desired angles or other range delimiters may be used. The upper and lower zones may be the same size, or the lower zone may be larger than the upper zone, depending on the needs of the game. While all angles have been described in relation to vertical, the complements of these angles and the horizontal can also be used to achieve the desired zone division.

Figure 6:
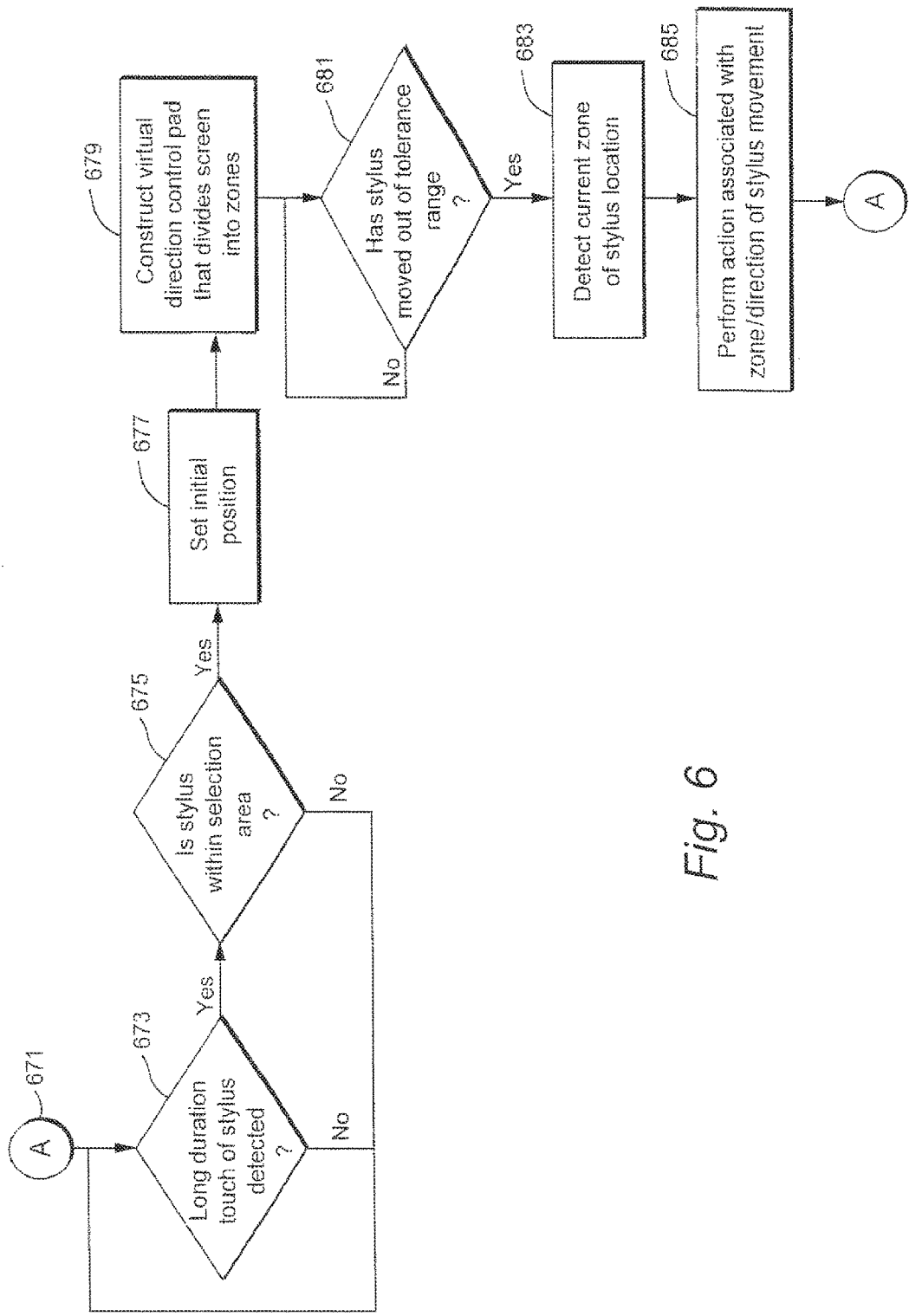
FIG. 6 shows a flowchart of an exemplary non-limiting illustrative implementation of stylus control over a game character.

FIG. 6 shows an exemplary non-limiting illustrative implementation of stylus control over a moving character. A movement control subroutine A 671 runs in the background while gameplay progresses. The subroutine waits at a stylus detection step 673 and continues to check for an initial (or other) stylus detection. If the stylus is detected, the subroutine then, in a selection detection step 675, checks to see if the stylus is within a selection area 203 defined for a game object to be controlled. If the stylus is not within a selection area 203, the subroutine returns to the stylus detection step. If the stylus is within the selection area 203, the subroutine sets stylus position at an initial position step 677. Then the subroutine considers the screen area to be divided into a plurality of zones at a zone setting step 679. The subroutine next determines if the stylus has moved out of a tolerance range surrounding the initial position at a stylus movement detecting step 681. If the stylus has not moved out of the tolerance range, the subroutine remains at this step 681. If the stylus has moved out of the tolerance range, the subroutine detects the zone in which the stylus currently resides at a zone detection step 683. Based on the zone detected in zone detection step 683, the subroutine processes an action associated with that zone (e.g., move the character in an appropriate corresponding direction) in an action processing step 685. The subroutine then begins again, waiting for the next action direction from the stylus.

Example Motion Control by Segment

Figure 7:
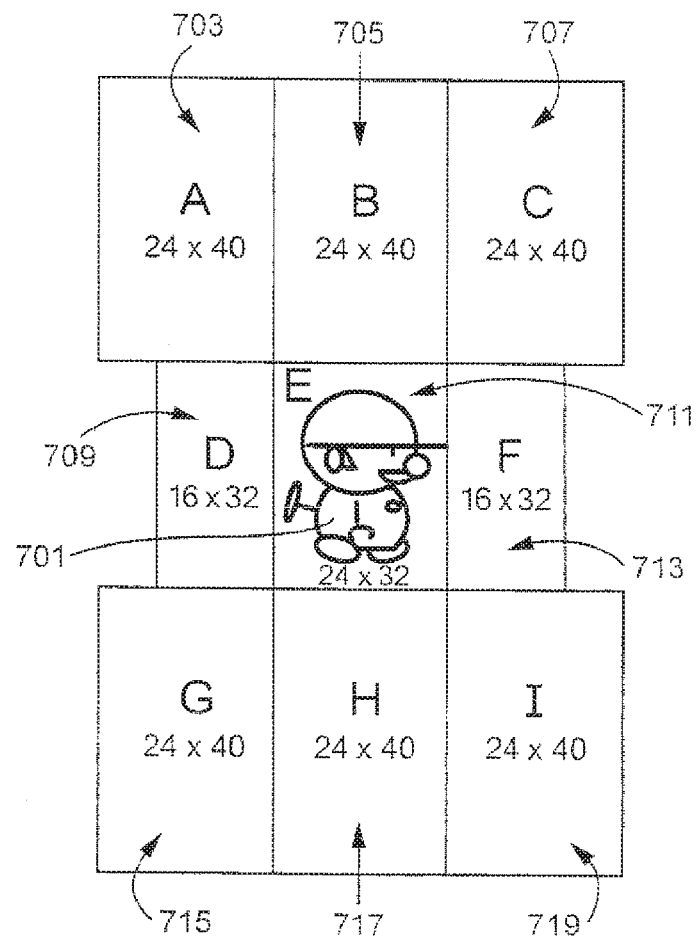
FIG. 7 shows an exemplary non-limiting illustrative implementation of a movable game character surrounded by a plurality of regions.

In FIG. 7, an exemplary representation of a game character 701 is shown, surrounded by a plurality of regions or segments. A centermost region 711 encompasses the game character in this exemplary non-limiting illustrative implementation. Eight additional regions of various sizes are arranged around the centermost region 711 in this exemplary illustrative non-limiting implementation. The regions comprise an upper left region 703, an upper middle region 705, an upper right region 707, a center left region 709, a center right region 713, a lower left region 715, a lower middle region 717, and a lower right region 719. Any number of suitable regions may be used. The regions do not need to be symmetrical or uniform in arrangement or size. It is possible to overlap more than two segments. In that case, it may be desirable to set priority order of detection by assigning priority numbers or values to the segments. Priority can be changed as desired or convenient.

In this exemplary illustrative non-limiting implementation, a user can instruct a character to move or act based on movement from one region to another. No matter where the stylus starts, as long as it passes through one of the rectangles, the system will detect its path and respond accordingly. For example, movement from the centermost region 711 to the upper left region 703 might cause the character 701 to jump. But movement doesn't have to be only between two regions. As another example, if the character is facing right, movement from the centermost region 711 through the center left region 709 to the upper middle region 705, might cause the character 701 to flip to face left and then jump. Any number of actions may be linked to different movements and movement patterns between regions.

Figure 8:
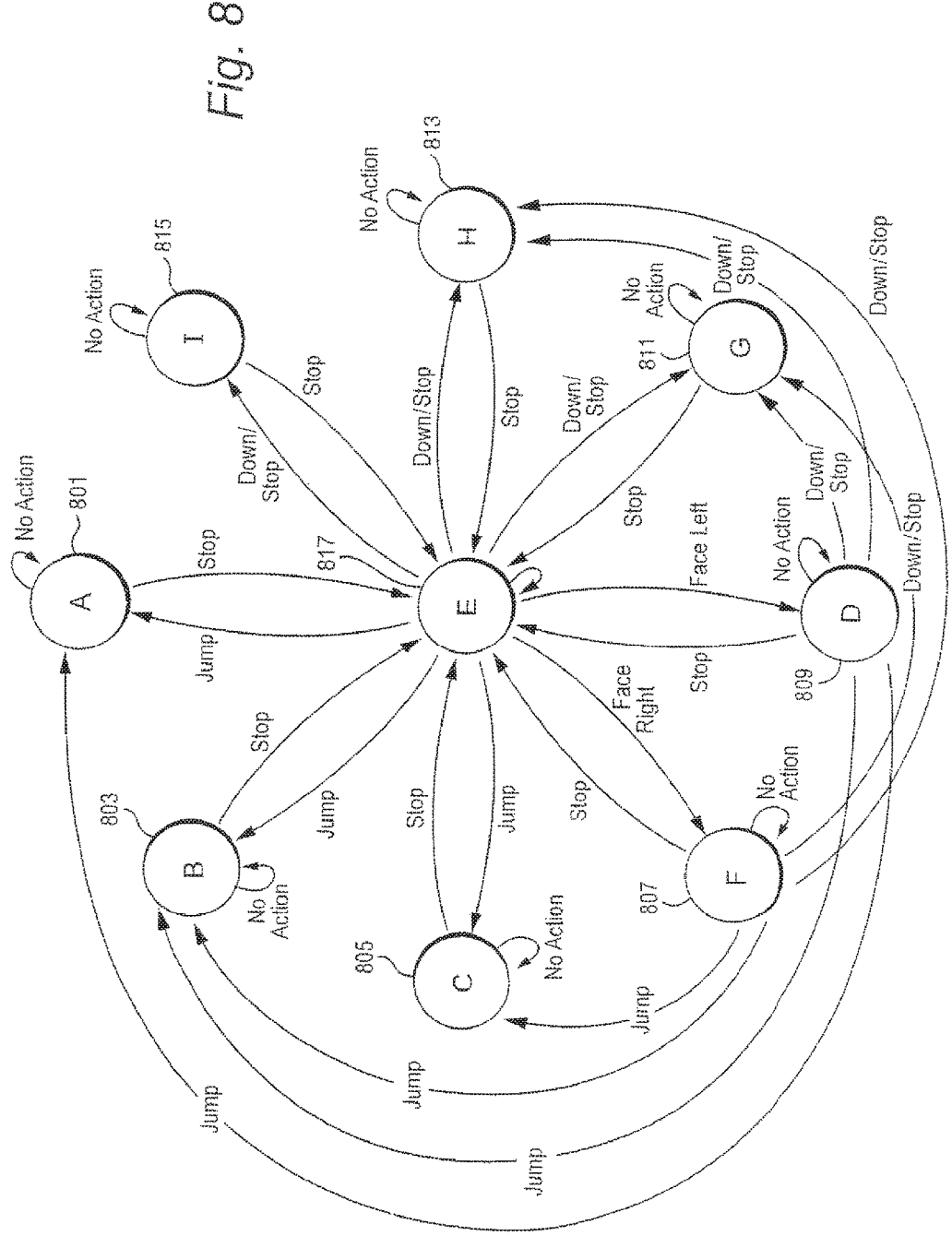
FIG. 8 shows a state diagram of an exemplary implementation of various actions associated with exemplary stylus control.

FIG. 8 shows a state diagram of an exemplary illustrative non-limiting implementation of various actions associated with exemplary stylus movement. While the stylus may initially touch the screen at any point, in one exemplary non-limiting illustrative implementation the program controlling movement does not begin tracking stylus stroke path until the stylus passes into one of a plurality of regions. Each state A, B, C, D, F, G, H, I represents motion from an initial stylus position (E) to a newer detectable stylus position the user can distinguish from the other states. In this particular implementation, the exemplary nine regions are represented by states A-I 801, 803, 805, 807, 817, 809, 811, 813, 815. The state diagram represents possible actions that could be taken by the digital object if the stylus passes through a series of exemplary regions. For example, if the stylus stroke begins in A 801 and moves to E 817, the object stops acting, or does nothing if it is already stopped. In another example, if the stylus begins in E 817 and moves to F 807 and then to B 803, the object faces right and then jumps. While these actions and patterns are described with respect to an exemplary implementation, any number of suitable states and transitions may be added to provide for any suitable actions or a series of actions.

See the following table summarizing such state transitions:

E→A=Jump
E→B=Jump
E→C=Jump
E→D=Left
E→F=Right
E→G=Down (Stop in case of no pipe)
E→H=Down (Stop in case of no pipe)
E→I=Down (Stop in case of no pipe)
E→D→A=Flip left and Jump (If facing to left, jump only)
E→D→B=Flip left and Jump (If facing to left, jump only)
E→F→B=Flip right and Jump (If facing to right, jump only)
E→F→C=Flip right and Jump (If facing to right, jump only)
E→F→H=Flip right and stop or down (If facing to right, stop or down only)
E→F→I=Flip right and stop or down (If facing to right, stop or down only)
E→D→G=Flip left and stop or down (If facing to left, stop or down only)

Figure 9A:
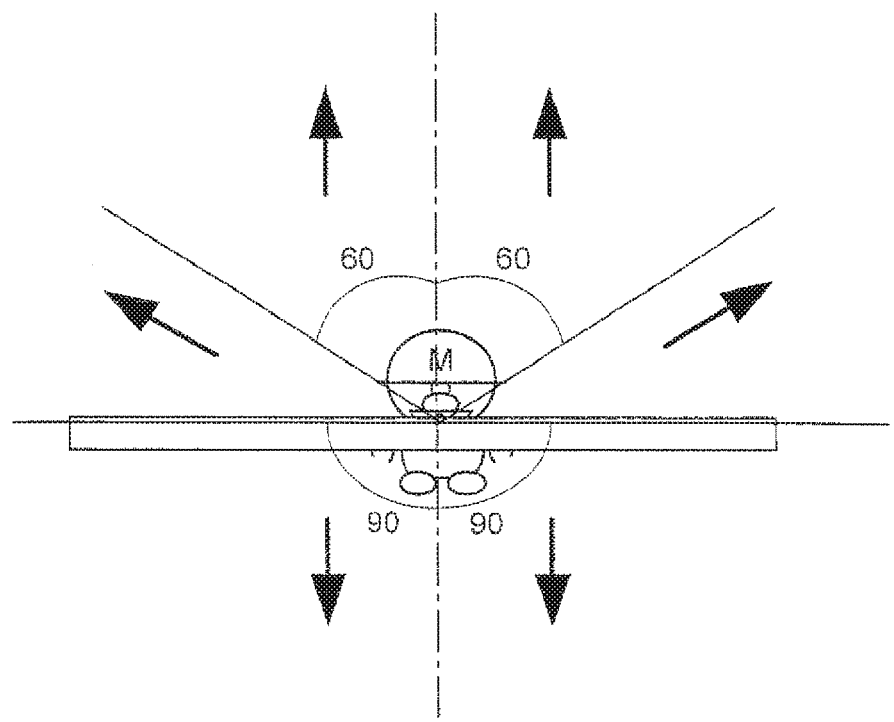
FIG. 9A shows an example further exemplary illustrative implementation using stylus touch to control rotation of a virtual character around a virtual object.
Figure 9B:
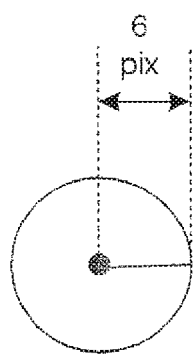
FIG. 9B shows more details concerning the exemplary FIG. 9A implementation including display of a virtual control wheel.

E→D→H=Flip left and stop or down (If facing to left, stop or down only)
A→E=Stop
B→E=Stop
C→E=Stop
D→E=Stop
E→E=No Action (not move)
F→E=Stop
G→E=Stop
H→E=Stop
I→E=Stop
=
A→A=No Action
B→B=No Action
I→I=No Action Exemplary Rotation Directional Control Based on Stylus Touch While the examples above refer primarily to translational motion of animated game characters, the technology herein can also be used to control different and/or additional types of movement such as for example rotational motion. FIG. 9A shows an additional exemplary illustrative non-limiting implementation using stylus touch to control the direction of rotational and translational movement of an animated character within a video game. In the example shown in FIG. 9A, the game character has encountered a bar that the game character can swing around. FIG. 9B shows an example touch control wheel that can be displayed on the same or different display screen as the character and bar. By touching and dragging the FIG. 9B wheel, the game player can control the motion of the game character as it spins or swings around the bar. For example, by using the stylus to turn the FIG. 9B wheel, it is possible to control the game character to spin at different rates around the bar. Furthermore, as shown in FIG. 9A, it is possible to draw gestures using the stylus in different areas of the display screen to cause the displayed game character to perform additional actions (e.g., jump off the bar and descend based on a downward stylus stroke; jump off the bar and ascend upwardly based on a downward stylus stroke; or move back and forth horizontally on the bar and/or jump off the bar and move sideways based on a leftward or rightward stroke. In the example shown, the stylus position range can be made larger (e.g., 6 pixels each way in one exemplary illustrative non-limiting implementation), but the specific range and the angles of the vectors used to identify the areas are based on design choice. The stylus sense range can be reduced if desired when the game character is not engaged in spinning round the bar.

While the technology herein has been described in terms of exemplary illustrative non-limiting implementations, it is understood that these implementations are provided by way of example only. For example, while a stylus contacting a touch screen is described above, strokes made using any other means (e.g., a finger on a touch pad, a handheld controller motion or a light pen tracing a path of a cursor on a television screen, etc.) are also possible. The invention is to be defined by the scope of the claims.

We claim:

1. A computing apparatus comprising:
a display device that is coupled to at least one touch-enabled display screen configured to receive touch input; and
a processing system that includes at least one hardware processor in communication with a memory device and the display device, the processing system cooperating with the display device to:
display a virtual object on the touch-enabled display screen;
receive a touch input provided to the touch-enabled display screen;
determine a first touch position on the touch-enabled display screen for the received touch input and determine which one of a plurality of regions on the touch-enabled display screen that the first touch position is located within;
track the touch input to at least a second touch position on the touch-enabled display screen, wherein the tracked touch input forms a path from the first touch position to the second touch position that passes through one or more additional regions different from a region where the first touch position was determined to be within; and
move the virtual object based on an order of the one or more of the plurality of regions through which the path of the touch input is determined to have passed through from the first touch position to the second touch position.

2. The computing device of claim 1, wherein the plurality of regions comprises at least three different regions.

3. The computing device of claim 2, wherein the path from the first touch position to the second touch position that passes through at least three different regions of the plurality of regions.

4. The computing device of claim 1, wherein at least some of the plurality of regions are different in shape and/or size.

5. The computing device of claim 1, wherein at least one of the plurality of regions overlaps another one of the plurality of regions.

6. The computing device of claim 5, wherein at least some of the plurality of regions are assigned a priority order that determines which one of the plurality of regions that are overlapped that the touch input is determined to be within.

7. The computing device of claim 1, wherein one of the plurality of regions approximately encompasses where the virtual object is displayed on the touch-enabled display screen.

8. The computing device of claim 1, wherein the object is a three-dimensional virtual object that is located in a three-dimensional virtual space and the object is controlled to move within the three-dimensional virtual space.

9. The computing device of claim 1, wherein the touch input is detected as a continuous touch input from the first touch position to the second touch position.

10. A non-transitory computer readable storage medium storing instructions for use with a computing apparatus that includes a processing system with at least one hardware processor coupled to a memory device and a display device that has a touch screen, the stored instructions comprising instructions that are configured to cause the processing system to:
generate an image of a virtual space that includes a virtual object located therein;
display the generated image on the touch screen of the display device;
receive a touch input provided to the touch screen;
determine a first touch position on the touch screen for the received touch input and determine which one of a plurality of areas on the touch screen that the first touch position is located within;
determine a second touch position on the touch screen for the received touch input and determine which one of a plurality of areas on the touch screen that the second touch position is located within;

determine an order of at least two of the plurality of areas through which the touch input passed from the first touch position to the second touch position; and cause the virtual object to a perform an action within the virtual space based on the determined order.

11. The non-transitory computer readable storage medium of claim 10, wherein the plurality of areas comprises at least three different areas.

12. The non-transitory computer readable storage medium of claim 10, wherein the touch input is determined to have passed, in the following order, through an area in which the first touch position was within, an areas that both the first and second touch position were not within, and an area in which the second touch position was within.

13. The non-transitory computer readable storage medium of claim 10, wherein at least some of the plurality of areas are different in shape and/or size.

14. The non-transitory computer readable storage medium of claim 10, wherein at least one of the plurality of areas overlaps another one of the plurality of areas.

15. The non-transitory computer readable storage medium of claim 10, wherein one of the plurality of areas approximately encompasses where the virtual object is displayed on the touch screen.

16. The non-transitory computer readable storage medium of claim 10, wherein the virtual object is a three-dimensional virtual object that is located in a three-dimensional virtual space and the virtual object is controlled to perform the action.

17. The non-transitory computer readable storage medium of claim 10, wherein the stored instructions are part of a computer game program and the virtual object is a player object that is controlled by a user of the computing apparatus, where the action is a gameplay movement action that causes the player object to perform a movement within the virtual space, where the order in which the touch input passes through at least two or more of the plurality of areas determines the gameplay movement action that the player object performs.

18. The non-transitory computer readable storage medium of claim 10, wherein the touch input is detected as a continuous touch input from the first touch position to the second touch position.

19. A computer-implemented method of controlling movement of a virtual object displayed on a touch screen that is coupled to at least one hardware processor, the method comprising:

displaying the virtual object on the touch screen;

accepting and processing a touch input provided to the touch screen;

determining a first touch position on the touch screen for the touch input and determine which one of a plurality of regions on the touch screen that the first touch position is located within;

tracking the touch input to at least a second touch position on the touch screen, wherein the tracked touch input forms a path from the first touch position to the second touch position that passes through one or more additional regions different from the region that the first touch position was located within before reaching the second touch position; and moving the virtual object based on how the path of the touch input from the first touch position to at least the second touch position has passed through different regions of the plurality of regions.

20. The method of claim 19, wherein the touch input is detected as a continuous touch input from the first touch position to the second touch position.

\* \* \* \* \*